United States Patent [19]

Nagumo et al.

[11] Patent Number: 4,477,888

[45] Date of Patent: Oct. 16, 1984

[54] MICROWAVE SYSTEM FOR PARTICLE AND SHOCK VELOCITY MEASUREMENT IN A GEOLOGICAL TYPE MATERIAL

[75] Inventors: George Nagumo, Park Forrest, Ill.; Donald A. Miller, Lyme, Conn.; Paul Lieberman, Torrance, Calif.

[73] Assignee: The United States of America as represented by the Secretary of the Army, Washington, D.C.

[21] Appl. No.: 318,500

[22] Filed: Nov. 5, 1981

[51] Int. Cl.³ .......................... G01V 1/16; G01S 9/56
[52] U.S. Cl. .................................... 367/152; 181/401
[58] Field of Search ............... 367/152, 176; 181/401; 73/579, 649, 576; 324/58.5 C; 333/227, 230, 231

[56] References Cited

U.S. PATENT DOCUMENTS

| | | |
|---|---|---|
| 2,830,267 | 4/1958 | Broussaud et al. ................ 367/176 |
| 2,907,032 | 9/1959 | Wheeler . |
| 3,276,025 | 9/1966 | Ikrath et al. . |
| 3,434,774 | 3/1969 | Miller . |
| 3,482,248 | 12/1969 | Jones . |
| 3,517,105 | 5/1970 | Lance et al. ........................ 333/227 |
| 3,618,106 | 11/1971 | Bryant . |
| 3,653,054 | 3/1972 | Wen . |
| 3,688,219 | 8/1972 | Hauers ............................... 333/231 |
| 3,818,333 | 6/1974 | Walker . |
| 3,836,962 | 9/1974 | Zaleski ............................... 333/230 |
| 3,927,369 | 12/1975 | Billeter et al. ................. 324/58.5 C |
| 3,975,695 | 8/1976 | Hartman ............................ 333/230 |
| 4,142,164 | 2/1979 | Nishihawa et al. ................ 333/227 |
| 4,257,001 | 3/1981 | Partair et al. .................. 324/58.5 C |

FOREIGN PATENT DOCUMENTS 0913071 3/1982 U.S.S.R. ............................... 73/579

Primary Examiner—Nelson Moskowitz
Attorney, Agent, or Firm—Darrell E. Hollis

[57] ABSTRACT

A microwave system uses a high dielectric constant waveguide embedded in a low dielectric constant sheath with mechanical properties matched to those of the surrounding geological material with an end microwave reflecting surface to create a standing wave to permit measurement of particle and shock velocities resulting from an explosion.

11 Claims, 4 Drawing Figures

POLYSTYRENE WAVEGUIDE

TEFLON WAVEGUIDE

MICROWAVE SYSTEM FOR PARTICLE AND SHOCK VELOCITY MEASUREMENT IN A GEOLOGICAL TYPE MATERIAL

STATEMENT OF GOVERNMENT INTEREST

The invention described and claimed herein may be manufacured and used by or for the Government of the United States of America for governmental purposes without the payment of royalties thereon or therefor.

BACKGROUND OF INVENTION

This invention relates to measurement of particle and shock velocities in a geological-type medium, and particularly to providing a new measuremcnt system utilizing micro-waves.

Heretofore, the Doppler cable system has been one of the principal methods of monitoring particle and shock waves emanating from a large scale disturbance or explosion. However, this system has several drawbacks, such as the inability to obtain close-in measurements without special isolation of its transmission line, and the inability to accurately determine the exact shock front position.

Another type of monitoring system used has been the switch-type system in which multiple gauges obtain shock front values. But with this type of system, arrival time data and requirements for individual cables and recorders present substantial drawbacks. Further, accurate location of the system components is required for shock front monitoring tasks. In addition, the system presents problems with respect to correlation of close-in data readings because of small timing errors. For verification of results in this particular field, it is also very desirable to use several types of testing apparatus, each of which makes use of a different physical principle. This invention provides measuring apparatus based on a different principle than those used heretofore, and which has greater sensitivity than the previously-used measuring systems.

SUMMARY AND FEATURES OF INVENTION

Accordingly, it is one of the principal features of this invention to provide a new type monitoring system for obtaining data relating to shock and particle velocities in geological-type material resulting from explosions.

It is another feature of this invention to provide a measuring system which has greater sensitivity and measuring capability than devices and systems used heretofore.

Another feature of this invention is to provide a monitoring device for underground explosions which has more precise arrival time and location data resolution.

A still further feature of this invention is to extend data acquisition over a greater range of peak pressures.

A still further feature of this invention is the providing of accurate close-in measurements for underground explosions.

A still further feature of this invention is the obtaining of continuous velocity and pressure amplitude measurements of the shock front and particle path in the field behind the shock front.

Another feature of this invention is the obtaining of extremely accurate static and dynamic readings to provide accurate blast location data.

Another feature of this invention is the providing of a microwave measuring system which has fewer practical limitations than other measuring techniques.

A still further feature of this invention is the providing of a new type of waveguide which can be used with microwave systems to obtain very accurate particle and shock wave readings.

These and further features and advantages of this invention will be apparent from the following description and claims.

DESCRIPTION OF THE INVENTION

Figure 1:
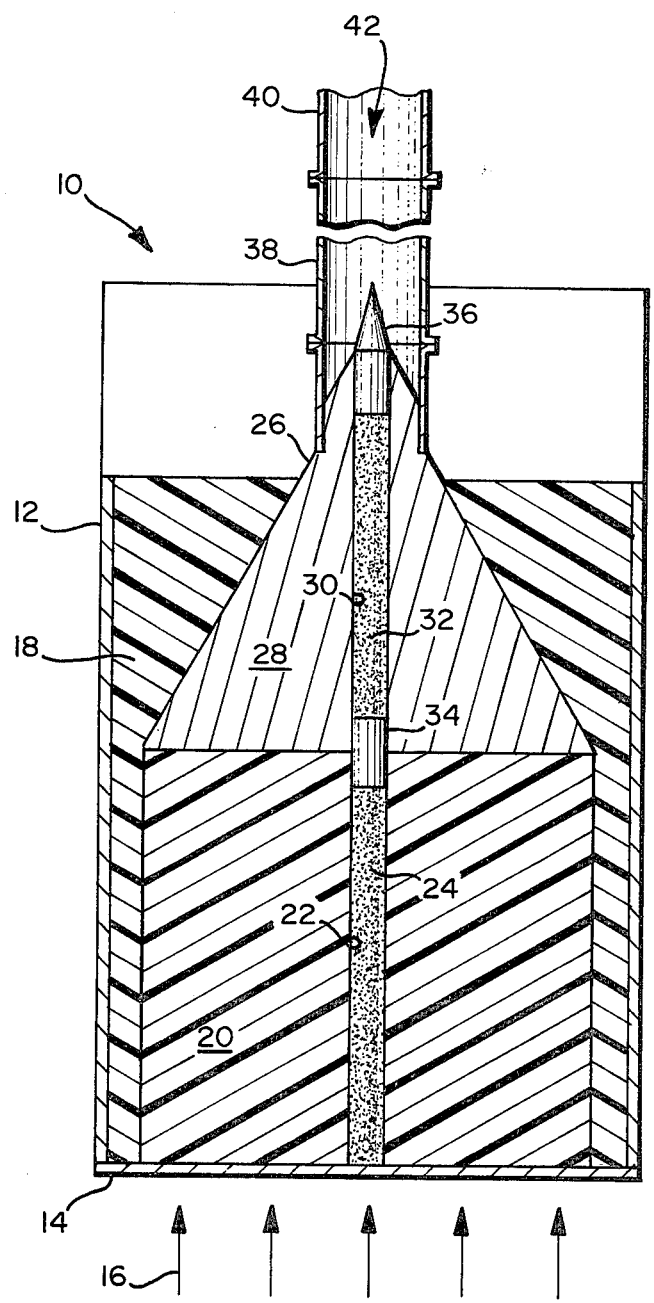
FIG. 1 is a sectional view of a dielectric/dielectric microwave transducer used in the microwave system.

Referring to FIG. 1, a dielectric waveguide generally indicated at 10 is the basic element in the microwave system. It acts as a transducer between the medium being tested and the microwave generating and receiving components of the system. It might be termed an interferometer, inasmuch as a standing wave field is generated within it which is responsive to movement produced by shock waves, for example, through a geological type material.

The dielectric waveguide is enclosed in a protective aluminum can cylinder 12, and is supported upon a flat aluminum reflecting plate 14, to which shock waves generally indicated at 16 are applied. The dielectric waveguide is installed in an instrumentation bore hole in direct contact with the geological material through which the shock waves are transmitted.

This is a sheath-type microwave dielectric waveguide. It has a low dielectric constant outer sheath, and a high dielectric constant inner core. It is essential that the waveguide material must closely match the elastic and plastic properties of the geological material which it is monitoring, to minimize the diffraction effects in the measurement of the transient pulse. The filler material 18 is an epoxy mixture which completely surrounds the waveguide.

The waveguide sheath section 20 is a thin circular cylinder of Teflon, approximately four and one-half inches in diameter and which has a dielectric constant of approximately 2.2. The inner core 22 is rectangular in cross section and is aligned along the common longitudinal axis of the waveguide with the outer sheath. The core cross section 24 is made up of a high dielectric constant material, which in this instance is Teflon powder having a high dielectric constant value of 8.

The upper part of the assembly includes a launcher horn 26 made of brass and having outwardly tapering walls 28 which terminate in registry with the top of the sheath 20.

A central rectangular cross section high dielectric waveguide element 30 is disposed along the axis of the waveguide within the launcher 26 and is filled with high dielectric Teflon powder having a high dielectric constant value of 8.

The lower core 24 and the upper high dielectric core 32 are in contact with opposite ends of the stycast transition slug 34 which also has a dielectric constant value of 8.

A stycast transition arrow 36 is placed at the top of the upper inner core 30 and provides for waveguide passage into the transition section 38 immediately below the X-Band microwave waveguide 40. The arrow direction 42 indicates the incoming microwave signal.

The microwave signal is transmitted downwardly through the dielectric/dielectric waveguide to the plate 14 and then is reflected back up through the waveguide against the direction of the incoming signals 42 to set up a standing wave pattern within the dielectric waveguide.

With movement of the metal plate, which in this case is a one-eighth inch thick aluminum plate, there is a shift in the position of the standing wave. The microwave (X-Band) waveguide section 40, the end of which is shown, carries both the incoming microwaves as well as the reflected microwave signals from the plate 14 which are picked up by the microwave transmitting and receiving circuit.

The mechanical properties of the dielectric/dielectric waveguide material closely match the elastic and plastic properties of the geological material to minimize diffraction effects in the measurement of the transient pulse. The dielectric properties of the waveguide materials during its stress-free and stressed states must also permit long distance transmission without alteration of the waveguide wavelength for the particle displacement measurement, for it must become more conductive under stress for the shock displacement measurement. For limited ranges of peak stresses at a given waveguide, with sufficient transmitted power, it is possible to simultaneously record the motion of a point in the shock loaded material and the motion of the shock front.

In all of the systems, it is necessary to reflect propagating microwave energy at a conducting surface or at a sharp permittivity discontinuity. The metal plate 14 serves this function.

Figure 2:
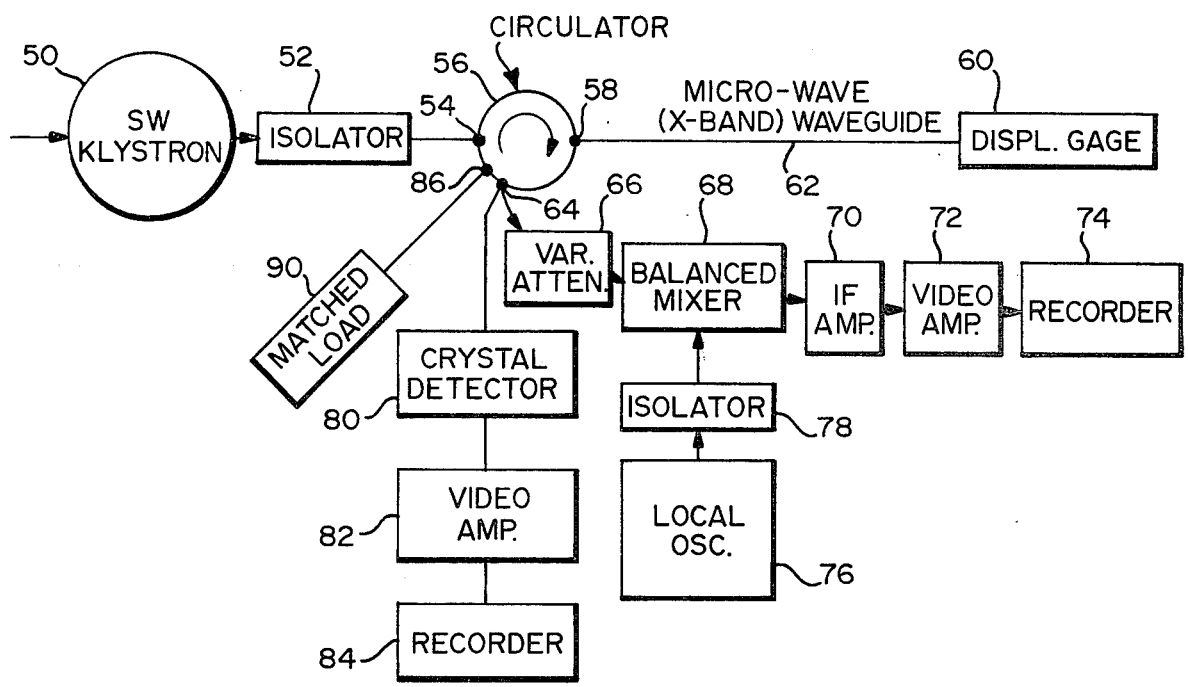
FIG. 2 is a block diagram of the entire microwave system.

In FIG. 2 a block diagram of the entire microwave system for the piezoresistive dielectric/dielectric waveguide is shown. A klystron supplies a signal to isolator 52 which is connected at 54 to the circulator 56. The contact 58 is connected to the dielectric displacement gauge of a similar construction as that described in FIG. 1 and is connected by a microwave waveguide 62 to the circulator.

Contact 64 is connected to the variable attenuator 66 and balanced mixer 68. The output from the mixer is supplied to the intermediate frequency amplifier 70 and the video amplifier 72 where it is then recorded on recorder 74. The mixer local oscillator 76 is connected through isolator 78 to the mixer 68.

The crystal detector 80 is connected to the switch contact 64 and has its output connected to the recorder 84 through the video amplifier 82. The circulator contact 86 is connected to the matched load 90. This system is used to supply a 7 to 11 gigahertz signal to the microwave waveguide 62 and the displacement gauge 60.

Figure 3:
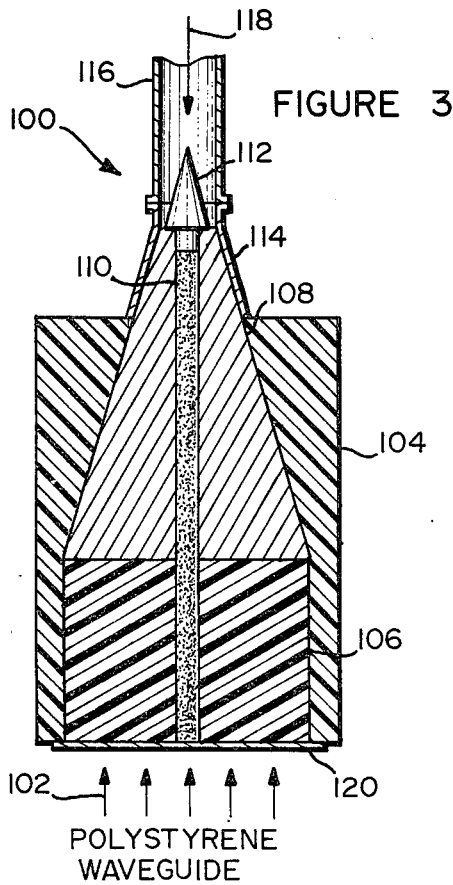
FIG. 3 is a sectional view of a polystyrene sheath microwave waveguide transducer used in the microwave system.

In FIG. 3 the standing wave waveguide generally indicated at 100 is a polystyrene sheath type unit which matches waveguide resonant frequency. The incoming shock waves 102 are transmitted through the medium. The epoxy encasing material 104 surrounds a polystyrene waveguide sheath 106 which has a diameter of slightly under four inches and a length of slightly over three inches. It has a low dielectric value of 2.56 and is capped by the horn launcher section 108. The central transmitting high dielectric core is approximately 0.2 by 0.4 inches and is filled with high dielectric Eccoflo power having a dielectric value of k=10. The transition section 112 is stycast material having a dielectric value of 10, and is in contact with the waveguide 116 which conducts the incoming microwaves 118. At the bottom of the unit a one-eighth inch thick aluminum plate is used a a reflecting element to create the standing waves and to provide the necessary flexure so as to shift the standing wave pattern when shock waves are received. The overall diameter of the unit is five inches and the overall length is ten and one-half inches to the midpoint of the stycast section at the top of the unit, where the waveguide 116 is coupled.

Figure 4:
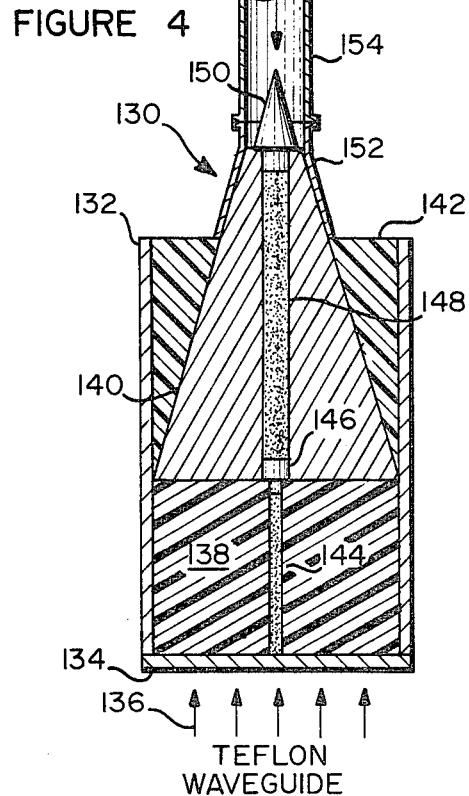
FIG. 4 is a cross-sectional view of a Teflon sheath microwave waveguide transducer used in a microwave detection system.

In FIG. 4, another design for the standing wave microwave guide is generally indicated at 130. It has a cylindrical aluminum tube to provide protection for the sheath type waveguide and is five inches in diameter. It rests on a bottom plate of one-eighth inch aluminum 134 through which shock waves generally indicated at 136 are applied. The circular Teflon sheath 138 fits within the inner diameter of the aluminum tube and is approximately three and one-eighth inches in longitudinal length. The launcher horn 40 is disposed on the top thereof and is approximately seven and one-quarter inches in overall length. It is surrounded by an epoxy filling 142. The lower high-dielectric core is a small rectangular slot 0.17 by 0.352 inches filled with Eccoflo powder having a dielectric constant of eight. A transition section 146 is disposed at the top of the core 144 along the central common longitudinal axis of the elements of the waveguide and is disposed immediately below a longitudinally extending 0.2 by 0.4 inch slot filled with Eccoflo powder having a dielectric constant of 8. The transition section 150 is stycast material having a dielectric constant of 8, and is supported at the coupling area 152 such that it projects within the microwave waveguide 154 to receive the on-coming microwave signals generally indicated at 156.

The dielectric waveguide unit in effect acts as a transducer in which a standing wave is produced by a reflection of microwaves at the sensing end of the unit, created by a conducting or a sharp permittivity discontinuity. Reflecting waves produce an interference which appears as a standing wave pattern throughout the waveguide. Motion of the metal plates at the sensing end of the waveguide results in corresponding motion of the standing wave pattern.

Propagation of the electromagnetic energy through a loss less dielectric rod of high permittivity embedded in a loss less low permittivity dielectric material is the basic construction of the standing wave transducer interferometer unit. Movement of the standing wave from a fixed point of reference as a result of received shock waves is measured. This is a function of the moving interface velocity caused by the oncoming shock waves. The motion history is determined when the waveguide wavelength is known because of the waveguide properties and the prior measurement of standing wave displacement. One of the major advantages of using microwaves is the fact that the measurements can be made of wavelength displacements which are small, and frequencies that are high, giving very small time measurement values. In the units constructed, the attenuation is dependent upon the excitation frequency For a core which is square and has a dielectric constant of 8, attenuations of 0.75 to 0.93 decibels per foot were obtained for applied frequencies of 7.5 to 10GHZ, respectively.

With respect to the units described above, it should be noted that the polystyrene type of unit is used preferably for geological material such as tuff, sand, and aluminum-bearing strata. The Teflon dielectric waveguide is preferably used for weathered rock type soils.

While this invention has been described, it will be understood that it is capable of further modification, uses and/or adaptations of the invention following in general the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:

1. A microwave system for measuring particle and shock velocity in a medium, comprising:
   (a) a waveguide for embedding in a medium;
   (b) microwave transmission means for coupling microwave signals at a preselected frequency to said waveguide;
   (c) a dielectric, disposed within said waveguide, having mechanical properties substantially matched with the mechanical properties of the medium;
   (d) a flexible element connected to one end of said waveguide for reflecting microwaves thereby providing a standing wave in the dielectric responsive to movement of said flexible element; and
   (e) a receiver responsive to said standing wave for determining the amount of movement of said standing wave.

2. The apparatus of claim 1 wherein said waveguide includes a launcher horn located between said dielectric and said transmission means.

3. The apparatus of claim 2 wherein said launcher horn is substantially one-shaped with the apex terminating in said transmission means and the base terminating at said dielectric.

4. The apparatus of claim 3 wherein said launcher horn includes a bore therein extending from said apex to said base, said bore being filled with a high dielectric core including a pair of transition slugs.

5. The apparatus of claim 1 wherein said dielectric includes:
   (a) a high dielectric core, and
   (b) a low dielectric sheath surrounding the core.

6. The apparatus of claim 5 wherein said high dieletric core includes a pair of transition slugs.

7. The apparatus of claim 5 wherein said core has a dielectric constant of approximately eight and said sheath has a dielectric constant of approximately two.

8. The apparatus of claim 4 wherein said high dielectric core has a dielectric constant of approximately eight.

9. The apparatus of claim 6 wherein said pair of transition slugs are fabricated from a stycast material.

10. The apparatus of claim 5 wherein said
    (a) high dielectric core is fabricated from teflon powder; and
    (b) said low dielectric sheath is fabricated from a solid teflon.

11. The apparatus of claim 2 wherein the launcher horn is fabricated from brass.

* * * * *